United States Patent
Park (10) Patent No.: US 12,026,549 B2
(45) Date of Patent: Jul. 2, 2024

(54) CONTROL UNIT FOR A VEHICLE AND AN OPERATING SYSTEM SCHEDULING METHOD THEREOF

(71) Applicant: HYUNDAI AUTOEVER CORP., Seoul (KR)

(72) Inventor: Young Soon Park, Anyang-si (KR)

(73) Assignee: HYUNDAI AUTOEVER CORP, Seoul (KR)

( * ) Notice: Subject to any disclaimer, the term of this patent is extended or adjusted under 35 U.S.C. 154(b) by 408 days.

(21) Appl. No.: 17/533,995

(22) Filed: Nov. 23, 2021

(65) Prior Publication Data

US 2022/0188159 A1    Jun. 16, 2022

(30) Foreign Application Priority Data

Dec. 15, 2020    (KR) .................... 10-2020-0175370

(51) Int. Cl.
```
G06F 9/48     (2006.01)
B60R 16/023   (2006.01)
G06F 9/50     (2006.01)
G06F 9/54     (2006.01)
```
(52) U.S. Cl.
CPC .......... *G06F 9/4887* (2013.01); *B60R 16/023* (2013.01); *G06F 9/5038* (2013.01); *G06F 9/542* (2013.01)

(58) Field of Classification Search
CPC ...... G06F 1/329; G06F 9/4843; G06F 9/4881; G06F 9/4887; G06F 9/52; G06F 9/526; G06F 9/528
See application file for complete search history.

(56) References Cited

U.S. PATENT DOCUMENTS

```
9,229,765  B2   1/2016  Lee et al.
9,632,822  B2*  4/2017  Chang ................... G06F 9/4881
11,321,123 B2*  5/2022  Rinaldi ................. G06F 9/4881
11,403,148 B2*  8/2022  Lenz .................... G06F 9/541
2013/0152100 A1 6/2013  Lee et al.
```

FOREIGN PATENT DOCUMENTS

```
KR     20130066900 A   6/2013
KR       101439355 B1   9/2014
```

OTHER PUBLICATIONS

Kim, J. et al., An Autosar-Compliant Automotive Platform for Meeting Reliability and Timing Constraints; SAE International; Technical Paper 2011-01-0448; 2011; 17 pp.
Office Action cited in corresponding Korean patent application No. 10-2020-0175370; dated Jul. 15, 2022; 10 pp.

* cited by examiner

*Primary Examiner* — Andy Ho
(74) *Attorney, Agent, or Firm* — Lempia Summerfield Katz LLC (57) ABSTRACT

A method of scheduling an operating system of a vehicle control unit includes determining a runnable function according to a first task requested from an application for a vehicle; executing the first task by operating with any one of a first thread and a second thread according to the determined runnable function for a first period in the first core; and when operating with the second thread in the first core, executing a first backup task corresponding to the first task in a second core that is different from the first core for the first period.

17 Claims, 6 Drawing Sheets

CONTROL UNIT FOR A VEHICLE AND AN OPERATING SYSTEM SCHEDULING METHOD THEREOF

CROSS-REFERENCE TO RELATED APPLICATIONS

This application claims priority to and the benefit of Korean Patent Application No. 10-2020-0175370, filed on Dec. 15, 2020, the entire contents of which are incorporated herein by reference.

TECHNICAL FIELD

The present disclosure relates to a control unit for a vehicle and relates to an operating system scheduling method thereof.

BACKGROUND

The statements in this section merely provide background information related to the present disclosure and may not constitute prior art.

In general, the environment of intelligent Electronic Control Unit (ECU) and technology driver requires a lot of computing performance Power and cost effectiveness are important parts, but High Performance Computing (HPC) in the safety area faces various challenges. In order to solve the problems, it is necessary to adopt the technology that the ECU cannot utilize and it is necessary to take full advantage of innovative technologies. AUTomotive Open System Architecture (AUTOSAR) adaptive platform dynamically manages resources and communication, distributes application programs while reducing effort for software development and integration, and allows a system integrator to carefully integrate the software to reduce the risk of bugs and ensure safety. The dynamic operation of the application program is limited by the constraints specified in the application program manifest. The dynamic allocation of the resources and the communication path during the execution is possible only with a defined method within a configured range. The implementation of the AUTOSAR adaptive platform limits the dynamic function in the configuration of the software to predetermination of processes, limits dynamic memory limit to a startup phase, limits scheduling policies in addition to priority-based scheduling, limits fixed allocation of processes for a Central Processing Unit (CPU), limits access to an existing file, limits restriction of the use of the Adaptive Platform (AP) Application Programming Interface (API), and limits the execution of an authorized code.

SUMMARY

The present disclosure has been made in an effort to provide a control unit for a vehicle, which reduces malfunction and increases reliability. The present disclosure also provides an operating system scheduling method thereof.

An embodiment of the present disclosure provides a method of scheduling an operating system of a vehicle control unit. The method includes determining a runnable function according to a first task requested from an application for a vehicle; executing the first task by operating with any one of a first thread and a second thread according to the determined runnable function for a first period in the first core; and when operating with the second thread in the first core, executing a first backup task corresponding to the first task in a second core that is different from the first core for the first period.

In one embodiment, the first thread may include a start-flag storing a start time of the thread and an end-flag storing an end-time of the thread.

In another embodiment, the second thread may include a thread flag manager, a thread main, a thread backup, and task scheduler information. The thread main may include a start-flag storing a start time of the thread, an end-flag storing an end-time of the thread, and a function pointer performing a runnable function mapped from the thread flag manager. The thread backup may include the start-flag and the end-flag.

In other embodiment, the thread flag manager may monitor the start-flag and the end-flag existing in the thread and perform the runnable function by using the runnable pointer when the task scheduler information, the start-flag, and the end-flag are not updated within a predetermined time.

In still other embodiment, when the runnable function is generated as a thread function, the thread flag manager may map the thread main and the thread backup.

In one embodiment, the thread main may monitor a thread period, and when the thread period of the thread main exceeds a predicted value, the thread of the thread backup may be performed.

In another embodiment, the method may further include generating an alarm to a user when the thread period of the thread backup exceeds the predicted value.

In another embodiment, the operating system may be implemented according to an AUTomotive Open System Architecture (AUTOSAR) adaptive platform.

Another embodiment of the present disclosure provides a control unit for a vehicle. The control unit for the vehicle includes a communication device configured to communicate with an external device; a memory configured to store an operating system; and a micro-control unit configured to control the communication device and the memory and drive the operating system. The operating system determines a runnable function according to a first task requested from an application for a vehicle. The operating system executes the first task by operating with any one of a first thread and a second thread according to the determined runnable function for a first period in the first core. The operating system executes a first backup task corresponding to the first task in a second core that is different from the first core during the first period when operating with the second thread in the first core.

In one form, during a second period after the first period, the operating system may execute a second task requested from an application for a vehicle in the second core.

In another form, the second task may be operated with the second thread to be executed, the operating system may execute a backup task of the second task in the third core during the second period, and the third core may be different from the first core and the second core.

In other form, during the third period after the second period, the operating system may execute a third task requested from an application for a vehicle in the second core.

In still other form, the third task may be operated with the second thread to be executed, the operating system may execute a backup task of the third task in the third core during the third period, and the third core may be different from the first core and the second core.

The control unit for the vehicle according to the embodiment of the present disclosure and the operating system scheduling method thereof separately execute a backup task, thereby improving accuracy of the task execution.

The control unit for the vehicle according to the embodiment of the present disclosure and the operating system scheduling method thereof secure stability, thereby reducing malfunction and improving reliability.

The foregoing summary is illustrative only and is not intended to be in any way limiting. In addition to the illustrative aspects, embodiments, and features described above, further aspects, embodiments, and features should become apparent by reference to the drawings and the following detailed description.

BRIEF DESCRIPTION OF THE DRAWINGS

Hereinafter, the accompanying drawings help to understand the present embodiment and provide the embodiments together with the detailed description. However, the technical characteristics of the present embodiments are not limited to a specific drawing, and the characteristics disclosed in each drawing may be combined with each other to be formed as a new embodiment.

It should be understood that the appended drawings are not necessarily to scale and present a somewhat simplified representation of various features illustrating the basic principles of the present disclosure. The specific design features of the present disclosure as disclosed herein, including, for example, specific dimensions, orientations, locations, and shapes, may be determined in part by the particular intended application and use environment.

In the figures, reference numbers refer to the same or equivalent parts of the present disclosure throughout the several figures of the drawing.

DETAILED DESCRIPTION

Hereinafter, the contents of the present disclosure are described clearly and in detail so that those having ordinary skill in the art can easily implement the present disclosure by using the drawings.

The present disclosure may have various modifications and various forms and thus specific embodiments are illustrated in the drawings and described in detail in the context. However, it is not intended to limit the present disclosure to the specific disclosed form, and it should be appreciated that the present disclosure includes all modifications, equivalences, or substitutions included in the spirit and the technical scope of the present disclosure. Terms, such as first and second, may be used for describing various constituent elements, but the constituent elements are not limited by the terms.

The terms are used only to discriminate one constituent element from another constituent element. For example, without departing from the scope of the present disclosure, a first constituent element may be named as a second constituent element, and similarly a second constituent element may also be named as a first constituent element. It should be understood that when one constituent element is referred to as being "coupled to" or "connected to" another constituent element, one constituent element can be directly coupled to or connected to the other constituent element, but intervening elements may also be present. By contrast, when one constituent element is referred to as being "directly coupled to" or "directly connected to" another constituent element, it should be understood that there are no intervening elements.

Other expressions, that is, "between . . . " and "just between . . . " or "adjacent to . . . " and "directly adjacent to . . . ", explaining a relationship between constituent elements, should be interpreted in a similar manner Terms used in the present application are used only to describe specific embodiments and are not intended to limit the present disclosure. Singular expressions used herein include plurals expressions unless they have definitely opposite meanings in the context.

Terms used in the present disclosure are used only to describe specific embodiments and are not intended to limit the present disclosure. Singular expressions used herein include plurals expressions unless they have definitely opposite meanings in the context. In the present application, it should be appreciated that terms "including" and "having" are intended to designate the existence of characteristics, numbers, steps, operations, constituent elements, and components described in the specification or a combination thereof. The terms "including" and "having" do not exclude a possibility of the existence or addition of one or more other characteristics, numbers, steps, operations, constituent elements, and components, or a combination thereof in advance. All terms used herein including technical or scientific terms have the same meanings as meanings, which are generally understood by those having ordinary skill in the art unless they are differently defined. Terms defined in generally used dictionary shall be construed that they have meanings matching those in the context of a related art and shall not be construed in ideal or excessively formal meanings unless they are clearly defined in the present application.

Figure 1:
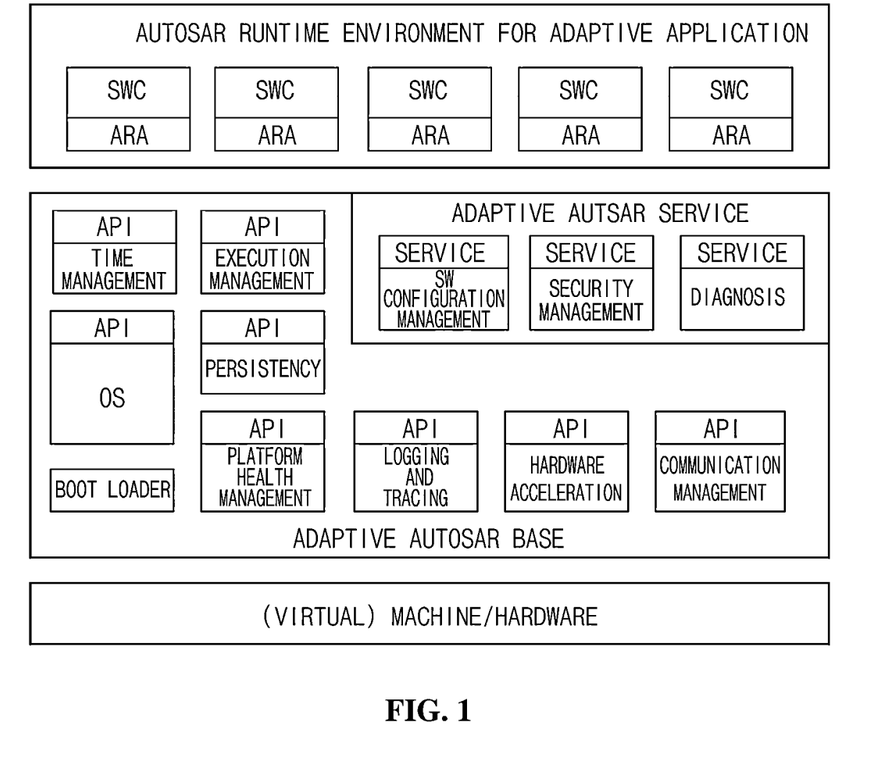
FIG. 1 is a diagram illustrating an architecture of a general AUTomotive Open System Architecture (AUTOSAR) adaptive platform.

FIG. 1 is a diagram illustrating an architecture of a general AUTomotive Open System Architecture (AUTOSAR) adaptive platform. Referring to FIG. 1, the adaptive platform provides functional clusters and basic services.

A Software Component (SWC) formalized and defined through an interface to Basic Software (BSW) is a component of the AUTOSAR architecture. The BSW module provides basic standard services, such as bus communication, memory management, IO access, systems, and diagnosis service. Other component of the AUTOSAR is a Runtime Environment (RTE), which controls connection between the SWCs or a connection from the SWC to the BSW. A Virtual Functional Bus (VFB) defined by the AUTOSAR provides a conceptual basis for using the communication between the SWCs and the BSW service. All of the communication of the SWC is based on the VFB, and thus the SWC is independent of ECU hardware. Through this, the SWC may be reused in a project and a platform. The VFB may be performed by being connected with the BSW appropriately set for each ECU and supplying a specially set RTE.

Adaptive Applications (AAs) is operated based on an AUTOSAR Runtime for Adaptive Application (ARA). The ARA is configured by an Application Programming Interface (API) provided by a functional cluster belonging to foundation or services. The foundation provides basic functions of the Adaptive Platform (AP) and the service. All of the adaptive applications may provide other adaptive applications with services.

The adaptive platform includes a functional cluster for providing better services. The functional clusters include a time management cluster, an OS cluster, an execution management cluster, persistence cluster, a platform health management cluster, a logging and tracing cluster, a hardware acceleration cluster, and a communication management cluster. The functional clusters communicate with other applications through the API, respectively. Since only the API implementation is defined, the degree of implementation freedom of the functional cluster of the adaptive platform is much higher than that of the BSW stack implementation configuring the existing classic platform.

The basic service includes a SW configuration management service, a security management service, and a diagnosis service. The basic service may be called through ara::com (AUTOSAR Runtime for Adaptive Applications) of middleware nature.

The adaptive platform considers hardware performed by a machine. The hardware is virtualized by using various technologies. The hardware includes one or more machines. Only one AP instance is performed. A single chip/a plurality of chips hosting the machines are included on the hardware.

Figure 2:
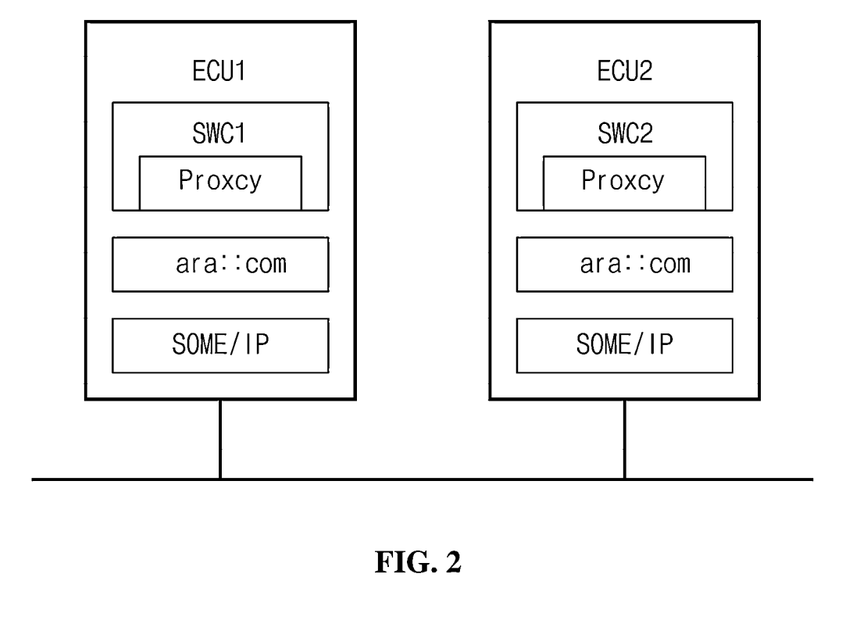
FIG. 2 is a diagram illustrating an example of proxy-skeleton service oriented communication through SOME/IP communication.

FIG. 2 is a diagram illustrating an example of proxy-skeleton service oriented communication through SOME/IP communication. The largest difference between the AUTOSAR adaptive platform and the classic platform is a communication method. Most of the existing classic platforms are based on a traditional signal-oriented communication. In the meantime, the adaptive platform is based on Service-Oriented Communication (SOC). The SOC is the communication method that dynamically connects a service required between Skeleton that is the server providing the service and a proxy that is a client consuming the service through the service discovery and the Scalable service-Oriented MiddlewarE over IP (SOME/IP). A vehicle application server is a system in which the AUTOSAR adaptive platform is mounted and is capable of freely monitoring and controlling a smart sensor and a smart actuator through the SOME/IP according to the use of a vehicle application.

In general, a method of scheduling a real-time operating system is very important in safety-sensitive control units, such as an autonomous driving platform for a vehicle. A method of scheduling a real-time operating system for a vehicle according to an embodiment of the present disclosure may execute a task based on priority. The scheduling the real-time operating system according to the embodiment of the present disclosure may be operated based on a scheduling table in which a time pint at which each task needs to be executed is predetermined.

In general, a task execution period and an execution order are determined in advance by giving a sufficient margin to the performance time of the SW allocated to the tasks, respectively. However, if the execution time exceeds a predetermined time in an unintentional case for each task, it may adversely affect the scheduling table and the entire SW. Accordingly, the scheduling of the real-time operating system of the present disclosure discloses a processing method when each task exceeds a predetermined time. For example, when the execution of each task is completed, it is possible to check whether the execution of the task is normally completed by inserting a set flag.

For important tasks, a separate computing process may be performed by placing a backup task. Further, when the task set to be important is not completed, the result from the backup task may be used. When the backup task is not properly completed within the execution time, the restart of the system or an operation of avoiding the risk may be performed through a user notification.

The scheduling of the real-time operating system according to the embodiment of the present disclosure may provide scheduling with high accuracy in an autonomous driving platform for a vehicle. Further, the scheduling of the real-time operating system according to the embodiment of the present disclosure may increase accuracy of the execution of the task by adding a function of backing up the execution of the important task by placing a separate backup task. The scheduling of the real-time operating system according to the embodiment of the present disclosure secures safety of a control unit for a vehicle and thus reduces malfunction and increases reliability.

Figure 3:
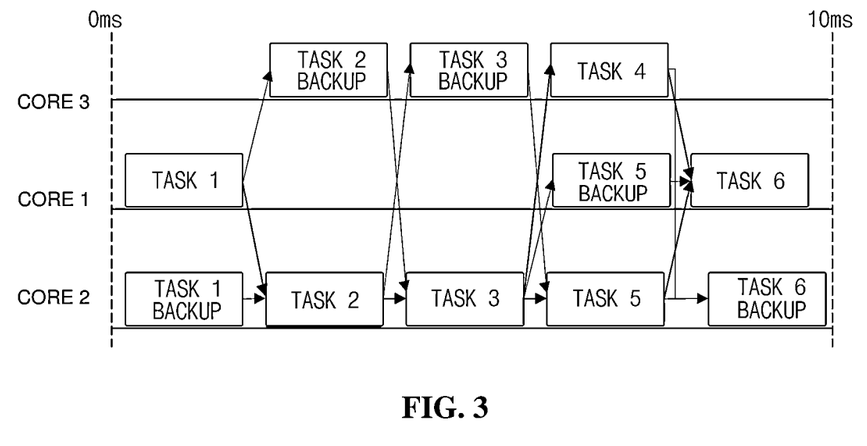
FIG. 3 is a diagram illustrating an example of scheduling of a real-time operating system in an AUTOSAR adaptive platform according to an embodiment of the present disclosure.

FIG. 3 is a diagram illustrating an example of scheduling of a real-time operating system in an AUTOSAR adaptive platform according to an embodiment of the present disclosure. Referring to FIG. 3, the execution of each of tasks (task 1 to task 6) may be completed within a time predetermined in the scheduling table. When the execution of the task is not completed within the predetermined time, the fact that the execution is not completed may be notified by floating a flag.

As illustrated in FIG. 3, a first task may be executed by operating with any one between a first thread and a second thread according to a runnable function during a first period in core 1 (a first core). Simultaneously, a first backup task corresponding to the first task may be executed in core 2 (a second core) during the first period.

During the second period after the first period, a second task requested from an application for a vehicle may be executed in core 2 (the second core). In the embodiment, the second task is operated with a second thread to be executed, and during the second period, the backup task of the second task may be executed in core 3 (the third core). In the embodiment, during the third period after the second period, a third task requested from the application for the vehicle may be executed in core 2 (the second core). In the embodiment, the third task is operated with the second thread to be executed, and during the third period, the backup task of the third task may be executed in core 3 (the third core). In the meantime, it should be understood that the scheduling of the operating system illustrated in FIG. 3 is merely an embodiment.

In the embodiment, the backup task may provide a simplified algorithm of the original task or a result that can output a predetermined result.

In the embodiment, a backup task may not be provided to all tasks, but a backup task may be provided only to the task that the developer has determined to be important. For example, the task is provided, and only when the original task is not executed within the execution time, the result may be used.

Figure 4:
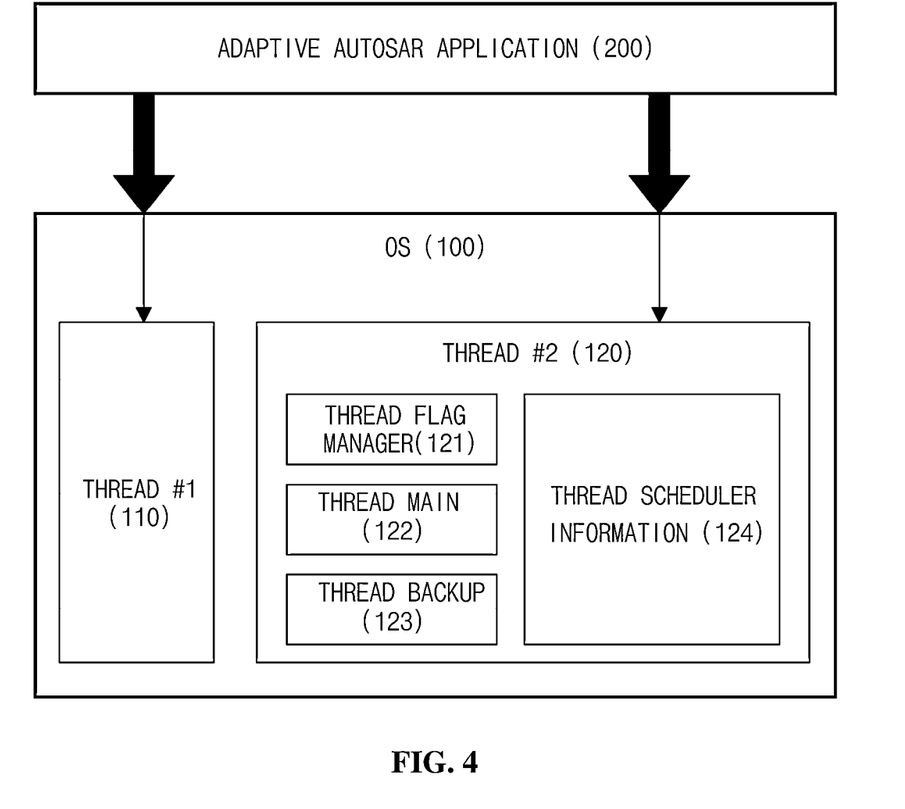
FIG. 4 is a diagram illustrating an operation of the AUTOSAR adaptive platform according to the embodiment of the present disclosure.

FIG. 4 is a diagram illustrating an operation of the AUTOSAR adaptive platform according to the embodiment of the present disclosure. Referring to FIG. 4, an adaptive AUTOSAR application may request a first runnable function and a second runnable function from the operating system 100. Both the first runnable function and the second runnable function need to be processed within a predetermined time (for example, 20 ms).

The operating system 100 may include two types of thread management units 110 and 120 corresponding to the first and second runnable functions.

The first thread management unit 110 may manage a first thread performing a general function. The first thread may include a start flat and an end flag.

A second thread management unit 120 may manage the second thread mentioned as the important task. For example, the second thread management unit 120 may issue a backup task for the second thread. The operating system 100 may recognize the second runnable function as a very important function.

The second thread management unit 120 may include a thread flag manager 121, a thread main 122, a thread backup 123, and thread scheduler information 124.

The thread flag manager 121 may manage the thread that the user has recognized as the important function by using the flag. In the embodiment, the thread flag manager 121 may observe the start flag and the end flag existing in each thread. For example, when the thread scheduler information 124 and the start-flag and the end-flag are not updated in time, the thread flag manager 121 may execute the functional function of a runnable address possessed by the thread flag manager 121. When the runnable function is generated with the thread function, two threads (thread main 122 and thread backup 123) may be mapped.

The thread flag manager 121 may monitor a deadline of the start-flag to the end-flag and the period of the thread in the thread main 122. When the period of the thread exceeds predicted information, the thread flag manager 121 may perform the thread of the thread backup 123.

When the same problem as that in the thread main 122 occurs even in the thread backup 123, the thread flag manager 121 may generate an alarm for the user. That is, the main function is to check the two thread operations, not one thread operation, and then process failure for the thread operations.

The thread main 122 may include the start-flag, the end-flag, and a function pointer. The start-flag includes a start time of the thread. The end-flag includes the time at which the thread ends. The function pointer may perform a runnable function mapped from the thread pointer manager 121.

The thread backup includes the start-flag and the end-flag. The start-flag includes a start time of the thread and the end-flag includes the time at which the thread ends. The runnable function is accurately similar to the thread main. When the thread main is normally operated, the thread backup is not executed at all.

Task scheduler information includes information for task scheduling and is a locally presenting meta file. The task scheduler information is not the application in the form of Daemon, such as a process. The task scheduler information includes information about a thread, which the thread flag manager 121 is to refer to, and runnable functions.

The information of the thread is the period (the operation period of the thread), the deadline (a difference value between the start-flag and the end-flag when the thread is operated, and a value that the thread must not exceed), and the function pointer (the runnable function to be performed).

Figure 5:
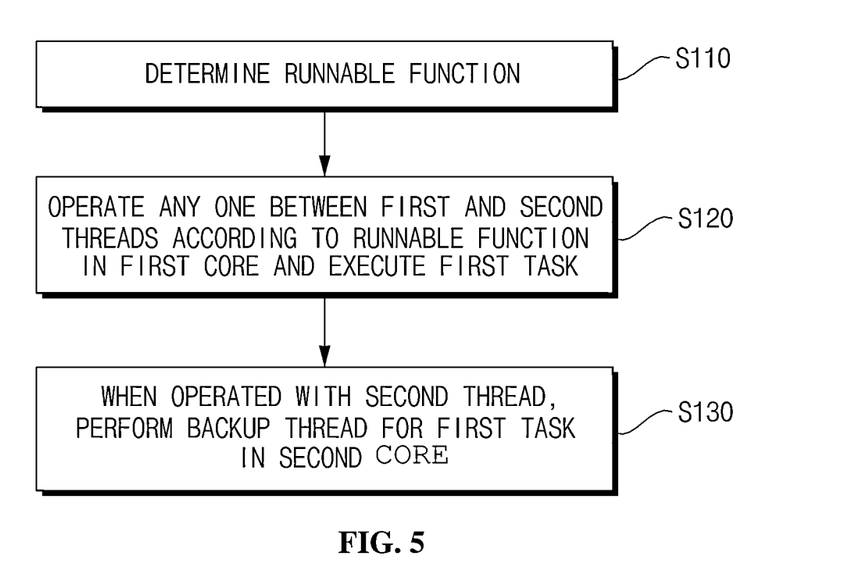
FIG. 5 is a flowchart illustrating an example of a method of operating a real-time operating system 100 according to an embodiment of the present disclosure.

FIG. 5 is a flowchart illustrating an example of a method of operating a real-time operating system 100 according to an embodiment of the present disclosure. Referring to FIGS. 3-5, the real-time operating system 100 may operate as follows.

The real-time operating system 100 may receive a thread execution request from the adaptive AUTOSAR application and determine a runnable function (S110). The real-time operating system 100 may operate with any one of a first thread and a second thread according to the runnable function determined in a first core and execute a first task (S120). Further, the real-time operating system 100 operates with the second thread in the first core, the real-time operating system 100 may execute a backup task of the first task in a second core different from the first core (S130).

In the embodiment, the first thread may include a start-flag storing a start time of the thread and an end-flat storing an end time of the thread. In the embodiment, the second thread may include a thread flag manager, a thread main, thread backup, and a task scheduler information. In the embodiment, the thread main may include a start-flag storing a start time of the thread, an end-flat storing an end time of the thread, and a function pointer performing a runnable function mapped from the thread flag manager.

In the embodiment, the thread backup may include a start-flag and an end-flag. In the embodiment, the thread flag manager may monitor the start-flag and the end-flag existing in the thread, and when the task scheduler information, the start-flag, and the end-flag are not updated within a predetermined time, the thread flag manager may perform the runnable function by using a runnable pointer. In the embodiment, when the runnable function is generated as a thread function, the thread flag manager may map the thread main and the thread backup.

In the embodiment, the thread period is monitored in the thread main, and when the thread period of the thread main exceeds a predicted value, the thread of the thread backup may be performed. In the embodiment, when the thread period of the thread backup exceeds the predicted value, an alarm may be transferred to a user. In the embodiment, the operating system may be implemented according to the AUTOSAR adaptive platform.

The steps and/or operations according to the present disclosure may occur in different orders, or in parallel, or simultaneously in different embodiments for different epochs and the like as may be appreciated by those having ordinary skill in the art. Depending on the embodiment, a part or the entirety of the steps and/or operations may be implemented or performed by using commands stored in one or more non-temporary computer-readable media, a program, an interactive data structure, and one or more processors driving a client and/or a server. One or more non-temporary computer-readable media are, for example, software, firmware, hardware, and/or any combination thereof. Further, the function of "module" discussed in the present specification may be implemented by software, firmware, hardware, and/or any combination thereof.

Figure 6:
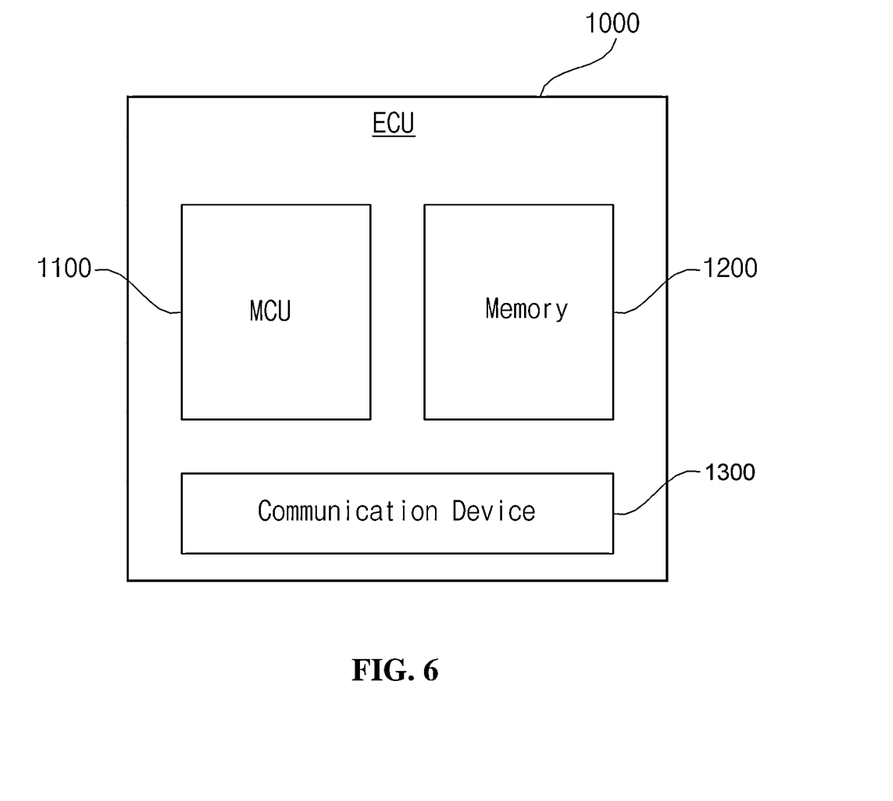
FIG. 6 is a diagram illustrating an example of a control unit 1000 for a vehicle according to the embodiment of the present disclosure.

FIG. 6 is a diagram illustrating an example of a control unit 1000 for a vehicle according to the embodiment of the present disclosure. Referring to FIG. 6, an electronic control unit (ECU) 1000 for a vehicle may include an MCU 1100, a memory 1200, and a communication device 1300.

The MCU 1100 may be implemented so as to perform the general operation of the ECU 1000 for the vehicle. The MCU 1100 may drive at least one program by executing at least one instruction. For example, at least one program may include the adaptive AUTOSAR application described with reference to FIGS. 3-5.

The MCU 1100 may include a plurality of cores. The plurality of cores may include at least one main core and at least one sub cores.

The memory 1200 may be implemented to store at least one program. The memory 1200 may include a volatile memory or a non-volatile memory. For example, the memory 1200 may include a storage medium, such as a Random Access Memory (RAM), a Static Random Access Memory (SRAM), a Read-Only Memory (ROM), a Programmable Read-Only Memory (PROM), an Electrically Erasable Programmable Read-Only Memory (EEPROM), a NAND Flash memory, and a NOR Flash memory.

The communication device 1300 serves as an interface capable of establishing communication with the outside of the ECU 1000 for the vehicle. In general, for the communication with the ECU 1000 for the vehicle and the external device of the ECU 1000 for the vehicle, Controller Area Network (CAN) communication, Local Interconnect Network (LIN) communication, and Ethernet communication may be used.

One or more non-transitory computer-readable media and/or means for implementing/performing one or more operations/steps/modules of the embodiments of the present disclosure may include controllers including Application-Specific Integrated Circuits (ASICs), standard integrated circuits, and micro-controllers performing appropriate commands, and/or an embedded controller, Field-Programmable Gate Arrays (FPGAs), Complex Programmable Logic Devices (CPLDs), and the equivalent devices thereof, but the present disclosure is not limited thereto.

In the meantime, the above-described contents of the present disclosure are merely specific embodiments for carrying out the present disclosure. The present disclosure includes not only concrete and practically usable means, but also technical ideas, which are abstract and conceptual ideas that can be utilized as technologies in the future.

Meanwhile, the embodiments according to the present disclosure may be implemented in the form of program instructions that can be executed by computers, and the embodiments may be recorded in computer readable media. The computer readable media may include program instructions, a data file, a data structure, or a combination thereof. By way of an example rather than a limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can accessed by computer. Communication media typically embodies computer readable instructions, data structures, program modules or other data in a modulated data signal such as a carrier wave or other transport mechanism and the communication media includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

As described above, the embodiments have been described and illustrated in the drawings and the specification. The embodiments were chosen and described in order to explain certain principles of the present disclosure and their practical application and thus enable those having ordinary skill in the art to make and utilize various embodiments of the present disclosure, as well as various alternatives and modifications thereof. As is evident from the foregoing description, certain aspects of the present disclosure are not limited by the particular details of the examples illustrated herein. It is therefore contemplated that other modifications and applications, or equivalents thereof, may occur to those having ordinary skill in the art. Many changes, modifications, variations and other uses and applications of the present construction should, however, become apparent to those having ordinary skill in the art after considering the specification and the accompanying drawings. All such changes, modifications, variations and other uses and applications, which do not depart from the spirit and scope of the present disclosure are deemed to be covered by the present disclosure, which is limited only by the following claims.

What is claimed is:

1. A method of scheduling an operating system of a vehicle control unit, the method comprising:
   determining, by a first core, a runnable function based on a first task requested from an Automotive Open System Architecture (AUTOSAR) application for a vehicle;
   executing, by the first core, the first task by operating with any one of a first thread and a second thread based on the determined runnable function for a first period in the first core; and
   when operating with the second thread in the first core, executing, by a second core, a first backup task corresponding to the first task in the second core that is different from the first core for the first period.

2. The method according to claim 1, wherein the first thread includes a start-flag storing a start time of the first thread and an end-flag storing an end-time of the first thread.

3. The method according to claim 1, wherein the second thread includes a thread flag manager, a thread main, a thread backup, and task scheduler information,
   wherein the thread main includes a start-flag storing a start time of the second thread, an end-flag storing an end-time of the second thread, and a function pointer performing a runnable function mapped from the thread flag manager, and
   wherein the thread backup includes a start-flag of the thread backup and an end-flag of the thread backup.

4. The method according to claim 3, further comprising:
   monitoring, by the thread flag manager, the start-flag and the end-flag existing in each of the main thread and the thread backup; and
   performing the runnable function by using a runnable pointer when the task scheduler information, the start-flag, and the end-flag are not updated within a predetermined time.

5. The method according to claim 4, further comprising:
   when the runnable function is generated as a thread function, mapping, by the thread flag manager, the thread main and the thread backup.

6. The method according to claim 4, further comprising:
   monitoring, by the thread main, a thread period, and when the thread period of the thread main exceeds a predicted value, executing the thread of the thread backup.

7. The method according to claim 6, further comprising:
generating an alarm to a user when the thread period of the thread backup exceeds the predicted value.

8. The method according to claim 1, further comprising: implementing the operating system according to an AUTomotive Open System Architecture (AUTOSAR) adaptive platform.

9. A control unit for a vehicle, comprising:
a communication device configured to communicate with an external device;
a memory configured to store an operating system; and
a micro-control unit configured to control the communication device and the memory and drive the operating system,
wherein the operating system is configured to:
determine a runnable function based on a first task requested from an Automotive Open System Architecture (AUTOSAR) application for a vehicle,
execute the first tasks by operating with any one of a first thread and a second thread based on the determined runnable function for a first period in a first core, and
execute a first backup task corresponding to the first task in a second core that is different from the first core during the first period when operating with the second thread in the first core.

10. The control unit according to claim 9, wherein during a second period after the first period, the operating system is configured to execute a second task requested from the AUTOSAR application for the vehicle in the second core.

11. The control unit according to claim 10, wherein the second task is operated with the second thread to be executed, and
wherein the operating system is configured to execute a backup task of the second task in a third core during the second period, and
wherein the third core is different from the first core and the second core.

12. The control unit according to claim 10, wherein during a third period after the second period, the operating system is configured to execute a third task requested from the AUTOSAR application for the vehicle in the second core.

13. The control unit according to claim 12,
wherein the third task is operated with the second thread to be executed,
wherein the operating system is configured to execute a backup task of the third task in a third core during the third period, and
wherein the third core is different from the first core and the second core.

14. The method according to claim 1, further comprising:
during a second period after the first period, executing a second task requested from the AUTOSAR application for the vehicle in the second core.

15. The method according to claim 14, further comprising:
executing a backup task of the second task in a third core during the second period,
wherein the second task is operated with the second thread to be executed, and
wherein the third core is different from the first core and the second core.

16. The method according to claim 14, further comprising:
during a third period after the second period, executing a third task requested from the AUTOSAR application for the vehicle in the second core.

17. The method according to claim 16, further comprising:
executing a backup task of the third task in a third core during the third period,
wherein the third task is operated with the second thread to be executed, and
wherein the third core is different from the first core and the second core.

* * * * *